Patented July 11, 1939

2,165,902

UNITED STATES PATENT OFFICE 2,165,902

METHOD OF TREATING PECTIN-CONTAINING RAW MATERIAL

Philip Bliss Myers, Scarsdale, N. Y., assignor to Sardik Incorporated, Jersey City, N. J., a corporation of Delaware No Drawing. Application January 18, 1938, Serial No. 185,520

11 Claims. (Cl. 260—210)

This invention relates to the treatment of pectin-containing raw material, and an object is to provide a method of conserving the jelly units and preventing loss or deterioration of the pectin in such raw material during the handling and storage thereof.

The main source of pectin is now either the residue from cider mills known as apple pomace, or the white rind or peel of citrus fruits known as albedo. Such raw material can be obtained in commercial quantities only during a relatively few months of the year when the fruit is ripening. Apple pomace is obtainable only when the cider mills are operating. Albedo is obtainable only when the canneries or citric acid plants are operating. The latter, for example, operate only from three to four months of the year. Hence, a year's supply of pomace or albedo to be used in preparing pectin must be acquired during a relatively short period in each year and stored for subsequent use.

When received, the raw material, either albedo or pomace, is usually ground and then kiln dried. As no impurities are removed during these operations, the resulting product is susceptible to fermentation with consequent loss of jelly units. For example, in the case of apple pomace which contains a relatively high percentage of fruit sugars, it is necessary to place the material in cold storage immediately after drying in order to prevent spoiling due to fermentation.

Also, the raw material contains the enzyme pectinase which breaks down the pectin and causes a loss of jelly units. This enzyme can be rendered inactive by heating the material to certain temperatures but this must be done immediately upon the material being ground or else a large percentage of jelly units will be lost. The ordinary kiln drying of the material is necessarily so slow that the material is not heated to the required temperature quickly enough to prevent a substantial loss of jelly units.

As the season advances, that is to say, as the fruit ripens, the amount of water soluble pectin present increases rapidly. Inasmuch as pomace and albedo are not available until the season is well advanced it is practically impossible to obtain raw material without a large percentage of water soluble pectin. As is well known, such pectin deteriorates rapidly under the influence of heat so that the customary kiln drying operation above referred to destroys a large and valuable part of the otherwise available pectin.

A further object of this invention is to provide a method of treating pectin-containing raw material which will not only overcome the inefficiencies in and objections to customary methods of treatment heretofore in use, but will enable the material to retain substantially its full available pectin content without any substantial loss of jelly units during the handling and storage thereof.

These and other objects which will be apparent to those skilled in the art are attained by means of the present invention, one embodiment of which is hereinafter described by way of example.

In carrying out this invention the raw material is subjected to a treatment in which the water soluble pectin present is rendered insoluble and resistant to those deteriorating influences usually encountered in the handling and storing of the material. This is accomplished by treating the raw material with copper which combines with the pectin present to form an insoluble copper pectinate. When so treated the material can be dried, in any desired manner, and stored for extended periods without suffering deterioration and without requiring cold storage. When wanted for use the metal can be easily eliminated by washing the material in a suitable bath.

The raw material is first ground to approximately $\frac{1}{4}''-\frac{1}{8}''$ size while it is as fresh as possible. The ground material is then leached or washed with a dilute copper salt solution, preferably a solution of copper sulphate, which is heated to a sufficient temperature to render the enzyme pectinase inactive, after which the raw material is separated out and dried.

In leaching, about 2.5 pounds of water should be employed for each pound of ground raw material, and enough copper salt used to provide approximately one pound of copper in the leaching water to each 18 pounds of water soluble pectin present in the raw material.

The percentage of water soluble pectin present in any given batch of raw material can be readily determined by well-known laboratory tests.

For example, assume one thousand (1000) pounds of ground grape fruit peel is being treated, and that tests show the peel to contain 3.5% pectin of which approximately 40% is water soluble. In other words, one thousand (1000) pounds of such albedo contain approximately 14 pounds of water soluble pectin. A leaching bath is prepared by providing approximately 2500 pounds of water in a suitable tank preferably having a false bottom. Copper in the form of a soluble copper salt is added to the water in sufficient quantities to provide approximately 1 pound of copper to every 18 pounds of water soluble pectin. In the present illustration, assuming that copper sulphate, CuSO$_4$.5H$_2$O, is employed, approximately 3.06 pounds of salt containing approximately 0.78 pound of copper is added and the bath heated to boiling.

As soon as the albedo is ground it is dumped into the boiling water and vigorously agitated. This introduction of the cold material into the bath will reduce the temperature thereof to a point below 90° C., the temperature at which the enzyme pectinase is rendered inactive. Accordingly, it is necessary to continue heating the bath in order to raise its temperature as rapidly as possible to approximately 90° C. and maintain it at that temperature for from 5 to 10 minutes.

Heating is then discontinued and the batch rapidly cooled to from 50° to 60° C., preferably by introducing approximately 2500 pounds of cold water into the bath. Upon cooling the bath is stirred for approximately 30 minutes after which the water is drained off through the false bottom and the residue, that is to say the pectin-containing raw material is dried in a kiln or in any other suitable form of drying apparatus.

Although the volumes of water given in the above example are not critical in any sense, the exact amount of water employed being relatively unimportant, it is advisable to use sufficient water to insure removal of most of the soluble constituents of the raw material.

It will be found that copper has combined with the soluble pectin present in the raw material so that the mount of copper in the leached material so treated is substantially non-hygrouble pectin present in the raw material. The material so treated is subtantially non-hygroscopic and the pectin is so stable that it can be dried over a period of two or three days in ordinary shelf driers and then kept for prolonged periods without loss of jelly units and without requiring refrigeration. As the material is not slimy, a much greater percentage of water can be removed by pressing than has heretofore been possible. For the same reason, the material can be more easily dried in a kiln as it will not stick to the sides thereof and being of lower moisture content can be dried at lower temperatures and therefore more economically than has heretofore been possible. As a matter of fact, any desired type of drying in addition to kiln drying can be employed without injuring the pectin content.

Also, as a result of the present process, the soluble constituents of the raw material are removed substantially without loss of soluble pectin so that after the leached material is dried it contains from 35 to 40% of pectin. This removal of impurities from the pectin-containing raw material constitutes an important advantage which is gained by the present invention. These impurities normally include invert sugars, acids, salts, oils, tannins and so forth. When present, being hygroscopic, they not only render the material difficult to dry, but after drying result in taking up moisture from the atmosphere. Heretofore, so far as I know, it has been impossible to remove these impurities previous to drying because at the same time the soluble pectin would be lost. However, as a result of the present process, the soluble pectin is retained in the material while the impurities are removed in the leaching operation. As a result, it will be found much easier to dry the raw material and at lower temperatures. Removal of the impurities increases the percentage of pectin in the dry material and reduces the weight of material which has to be stored. The enzyme pectinase has also been rendered inactive without loss of soluble pectin. Pectin extracts made from raw material treated in accordance with the present invention can be more easily clarified because of the less slimy quality of the extract obtained from such material.

The invention can be variously modified and adapted within the scope of the appended claims.

I claim:

1. That step in the process of treating pectin-containing raw material which consists in leaching the material with a copper salt solution to form an insoluble copper pectinate.

2. That step in the process of treating pectin-containing raw material which consists in leaching the material with a solution of copper sulphate containing sufficient copper to combine with susbtantially all soluble pectin present to form an insoluble copper pectinate.

3. The process of treating pectin-containing raw material which consists in grinding the material, leaching the material with a copper sulphate solution to transform the pectin into a copper pectinate, heating during the leaching operation, separating out the leached material and drying.

4. The process of treating material containing water soluble pectin which comprises washing the material with a solution of a copper salt to transform pectin into an insoluble copper pectinate, and simultaneously heating the material to a temperature sufficient to inactivate the enzyme pectinase.

5. The process of treating material containing water soluble pectin which comprises washing the material with a solution of a copper salt to transform pectin into an insoluble copper pectinate, and simultaneously heating the material to 90° C. to inactivate the enzyme pectinase.

6. The process of treating pectin-containing raw material which comprises grinding the material, leaching the material with a solution of a copper salt heated to approximately 90° C. to transform the pectin into a copper pectinate, separating the material therefrom and again heating the material to dry the same.

7. The process of treating pectin-containing raw material which consists in grinding the raw material, leaching the material in a copper salt solution comprising approximately 1 pound of copper to each 18 pounds of soluble pectin present in said raw material to transform the pectin into an insoluble copper pectinate.

8. The process of treating pectin-containing raw material which consists in grinding the raw material, leaching the material in a copper salt solution comprising approximately two and one-half parts of water to each part of raw material and approximately 1 pound of copper to each 18 pounds of soluble pectin present in said raw material to transform the pectin into an insoluble copper pectinate and to remove the soluble impurities therefrom.

9. The process of treating pectin-containing raw material which comprises grinding the material, leaching the material with a copper sulphate solution heated to approximately 90° C., to transform the pectin into an insoluble copper pectinate, separating the material therefrom and again heating the material to dry the same.

10. The process of treating pectin-containing raw material which consists in grinding the material, leaching the material in a copper sulphate solution comprising approximately two and one-half parts of water for each part of raw material and sufficient copper sulphate to provide approximately 1 pound of copper to each 18 pounds of soluble pectin present in said raw material to transform the pectin into an insoluble copper pectinate, heating the solution sufficiently to render the enzyme pectinase inactive, then separating the material from the solution, and again heating the material to dry the same.

11. A process of treating pectin-containing raw material which consists in treating the material with a copper salt in sufficient quantity to react with substantially all soluble pectin present to form an insoluble copper pectinate, separating out the leached material, and drying.

PHILIP BLISS MYERS.